United States Patent [19]

Nakamura et al.

[11] Patent Number: 5,767,611
[45] Date of Patent: Jun. 16, 1998

[54] STRUCTURE FOR SUPPORTING AN OSCILLATOR

[75] Inventors: Takeshi Nakamura, Uji; Yoshiaki Heinouchi, Joyo, both of Japan

[73] Assignee: Murata Manufacturing Co., Ltd., Kyoto-fu, Japan

[21] Appl. No.: 629,476

[22] Filed: Apr. 10, 1996

[30] Foreign Application Priority Data

Apr. 12, 1995 [JP] Japan ............................... 7-112381

[51] Int. Cl.⁶ .................................................. H01L 41/08
[52] U.S. Cl. .................................... 310/321; 310/353
[58] Field of Search ................................ 310/344, 348, 310/321, 323, 351–353

[56] References Cited

U.S. PATENT DOCUMENTS

| | | | |
|---|---|---|---|
| 1,875,324 | 9/1932 | Bower | 310/353 |
| 2,484,428 | 10/1949 | Smith | 310/351 |
| 2,523,701 | 9/1950 | Kuehl | 310/353 |
| 2,635,199 | 4/1953 | Wolfskill | 310/353 |
| 3,069,572 | 12/1962 | Dick et al. | 310/353 |
| 4,219,756 | 8/1980 | Nishida et al. | 310/348 |
| 4,899,076 | 2/1990 | Kato | 310/353 X |

*Primary Examiner*—Mark O. Budd
*Attorney, Agent, or Firm*—Ostrolenk, Faber, Gerb & Soffen, LLP

[57] ABSTRACT

An oscillator includes an oscillatory element in the form of a triangular prism. Two supporting members are fixed at their center to the oscillatory element. The two supporting members include annular coils, each with a single turn. The supporting members have inner peripheral portions which are fixed to the ridge of the oscillatory element at a location adjacent to its nodes. The oscillatory element has three sides on which three piezoelectric elements are correspondingly formed. When a drive signal is applied to two of the piezoelectric elements, then the oscillatory element is bent or oscillated in a direction perpendicular to the surface of the other piezoelectric element.

11 Claims, 5 Drawing Sheets

FIG. 3A
PRIOR ART
FIG. 3B
PRIOR ART
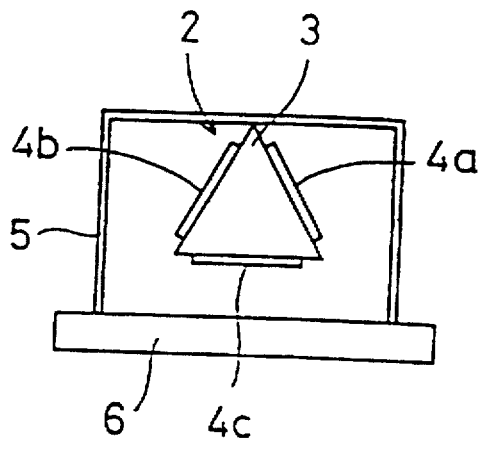
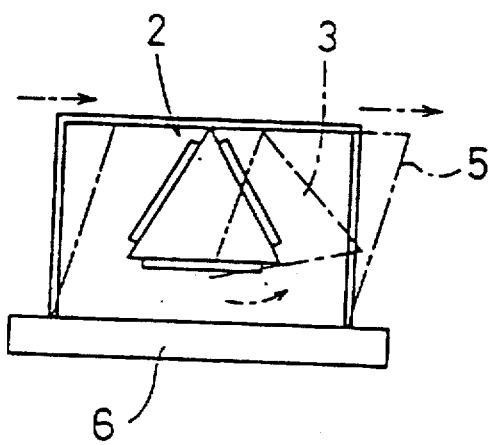
FIG. 4A
PRIOR ART
FIG. 4B
PRIOR ART
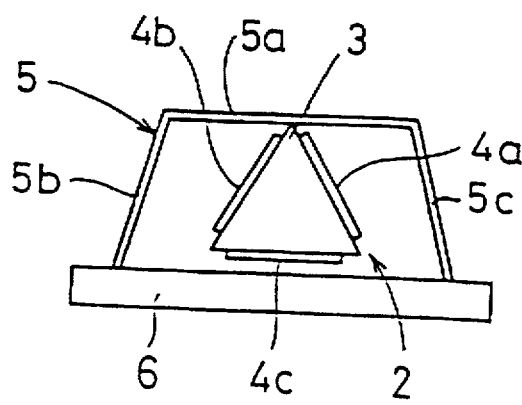
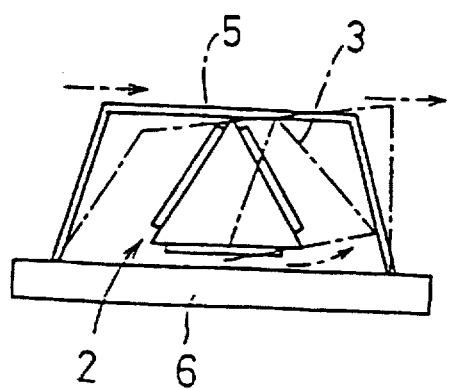

5,767,611

STRUCTURE FOR SUPPORTING AN OSCILLATOR

BACKGROUND OF THE INVENTION

1. Field of the Invention

The present invention relates to a structure for supporting an oscillator and more particularly to, such a structure for use, for example, with an oscillator gyroscope for detecting angular velocity.

2. Description of the Related Art

FIG. 3(A) is a front view of one example of an oscillator gyroscope known in the art to which the present invention pertains. FIG. 3(B) is a front view showing the mode of operation of an oscillatory element and a supporting member when shock loads are imposed on the oscillator. An oscillator gyroscope 1 includes an oscillator 2. The oscillator 2 has an oscillatory element 3 in the form, for example, of a triangular prism. Three piezoelectric elements 4a to 4c are mounted substantially centrally to three sides of the oscillatory element 3, respectively.

The oscillator 2 has two nodes. Two supporting members 5, 5 have a C-shape and are attached to the oscillator 2 at a location near the two nodes of the oscillator 2. Specifically, the two supporting members 5, 5 are fixed at their center to the ridge of the oscillatory element 3 adjacent to the two nodes. Opposite ends of the two supporting members 5, 5 are also fixed to a base plate 6, respectively. With the known oscillator gyroscope 1, the oscillator 2 is thus suspended by the supporting members 5, 5.

A drive signal is applied to the piezoelectric elements 4a and 4b or the piezoelectric element 4c. As this occurs, the oscillatory element 3 is bent or oscillated in a direction (X-axis direction) perpendicular to a longitudinal axis of the piezoelectric element 4c. If the oscillatory element 3 is rotated about its own axis, it is oscillated in a different direction due to the Coriolis force. This creates a voltage difference between the output signals of the piezoelectric elements 4a and 4b. By measuring this voltage difference, it is possible to detect angular velocity of an object.

A problem with the known oscillator gyroscope 1 shown in FIG. 3 is that the supporting members 5 are subjected to deflection in the widthwise direction of the oscillator 2 when undue external lateral loads are imposed on the oscillator 2. This results in unintentional application of a torque to the oscillator 2. If this happens, it is not possible to accurately detect angular velocity.

To this end, attempts have been made to increase the mechanical strength of the supporting members to resist undue lateral and axial shock loads. Referring to FIG. 4, the supporting member 5 is trapezoidal and has diverging ends. More specifically, the supporting member 5 has a straight intermediate portion 5a extending along the width of the oscillator 2, and two straight legs 5b and 5c diverging downwardly from opposite ends of the intermediate portion 5a.

Referring to FIG. 5, there has also been proposed a protection stopper 7 in order to prevent the supporting member from being subjected to plastic deformation due to undue shock loads applied in the widthwise direction of the oscillator 2 (or the direction in which the Coriolis force is applied), or to limit displacement of the supporting member 5 due to shock loads in the axial direction of the oscillator 2.

However, the supporting member 5 shown in FIGS. 3 or 4 must be long since it has a C-shape or trapezoidal shape and is fixed to the oscillatory element 3 and the base plate 6. This results in an increase in the size of the oscillator 2. Moreover, where the supporting member 5 has a C-shape or inverted U-shape, the corners of the supporting member 5 is machined to maximize its radius of curvature. This results in an increase in the production cost of the oscillator.

The oscillator supporting structure shown in FIG. 4 has better mechanical strength against lateral shock loads than that shown in FIG. 3, but there is still a need to improve mechanical strength of the structure.

The oscillator supporting structure shown in FIG. 5 requires a protection stopper 7, in order to limit plastic deformation of the supporting member 5 due to external shock loads. However, the use of the protection stopper 7 brings about an increase in the size of the oscillator 2. It also increases the production cost of the oscillator 2 since it adds a number of assembly steps.

SUMMARY OF THE INVENTION

Accordingly, it is a principal object of the present invention to provide a structure for supporting an oscillator which better resists shock loads, can readily be made compact, and is inexpensive to manufacture.

According to the present invention, there is provided a structure for supporting an oscillator, which comprises an oscillator including an oscillatory element having nodes, and supporting members fixed to the oscillatory element at a location adjacent to the nodes, wherein the supporting members include annular coils within which the oscillator is secured.

The annular coils may have one turn.

The annular coils may have a plurality of turns. In this case, the oscillator is secured to one of the plurality of turns of the coils.

The annular coils of the supporting members limit lateral or widthwise displacement of the oscillator. Thus, the supporting members limit rotation of the oscillator. Specifically, when external shock loads are laterally applied to the oscillator, the oscillator is displaced due to a change in the configuration of the annular coils. This displacement counteracts distortion of the oscillator per se. In this way, the rotation of the oscillator is limited. The inner side of each of the annular coils serves as a protection stopper for the oscillator.

The present invention offers the following advantages.

The supporting members are coiled to receive the oscillator therewithin. The inner peripheral portions of the supporting members serve to limit undue displacement of the oscillator which may occur when external shock loads are imposed on the oscillator. Thus, the oscillator supporting structure resists shock loads.

There is no need to provide a separate protection stopper for limiting displacement of the oscillator as in the prior art. Thus, the structure of the present invention is more compact than the prior art structure and is also economical to manufacture since there is no need to provide such a protection stopper.

The supporting members are annular rather than C-shaped or trapezoidal. This brings about a reduction in the production cost.

The structure of the present invention better resists shocks, is compact and is inexpensive. An oscillator gyroscope to which the present invention is applied is capable of accurately detecting angular velocity.

The above and other objects, features and advantages of the present invention will become more apparent from the following detailed description of preferred embodiments when taken in conjunction with the accompanying drawings.

BRIEF DESCRIPTION OF THE DRAWINGS

FIG. 3(A) is a front view of one example of an oscillator gyroscope known in the art;

FIG. 3(B) is a front view of the oscillator gyroscope shown in FIG. 3(A) showing the manner in which an oscillatory element and supporting members are moved when shock or similar loads are imposed on an oscillator;

FIG. 4(A) is a front view of another conventional oscillator gyroscope;

FIG. 4(B) is a front view of the oscillator gyroscope shown in FIG. 4(A) showing the manner in which an oscillatory element and supporting members are moved when shock or similar loads are imposed on an oscillator;

DESCRIPTION OF THE PREFERRED EMBODIMENTS

Figure 1A:
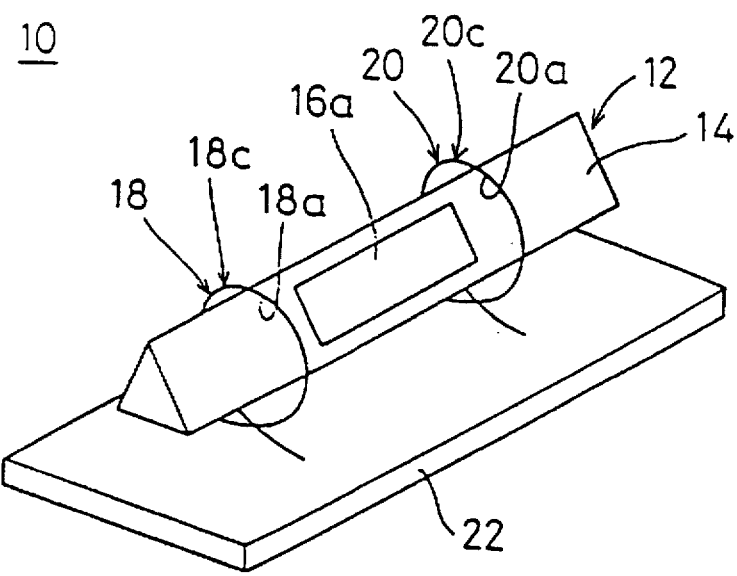
FIG. 1(A) is a perspective view of an oscillator gyroscope according to one embodiment of the present invention.
Figure 1B:
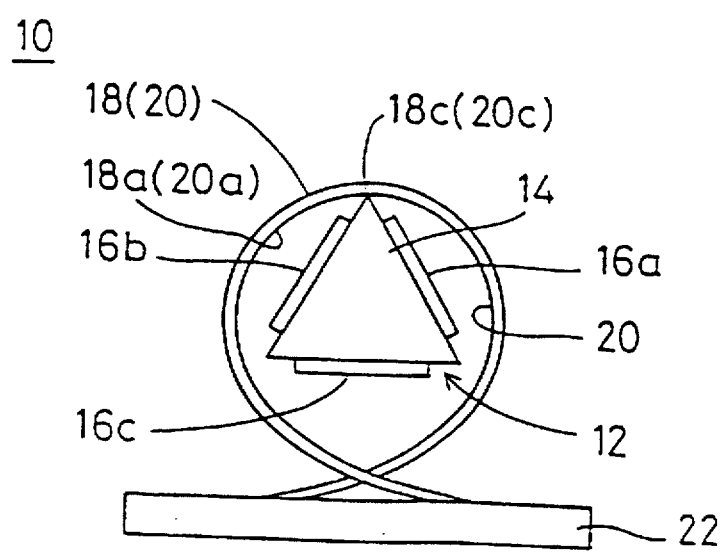
FIG. 1(B) is a front view of the oscillator gyroscope shown in FIG. 1(A)

FIG. 1 is a perspective view of one embodiment of the present invention. FIG. 2 is a front view of the embodiment shown in FIG. 1. The present invention relates to a structure for supporting an oscillator. In the following description, the present invention is applied to an oscillator gyroscope.

An oscillator gyroscope 10 includes an oscillator 12. The oscillator 12 has an oscillatory element 14 in the form, for example, of a triangular prism. This oscillatory element 14 is made of elinvar, an iron-nickel alloy, quartz, glass, crystal, ceramic or other materials that typically generate mechanical vibrations. Three piezoelectric elements 16a, 16b and 16c are centrally attached to three respective sides of the oscillatory element 14.

When a drive signal is applied to the piezoelectric elements 16a and 16b or the piezoelectric element 16c, the oscillatory element 14 is oscillated in a direction (X-axis direction) perpendicular to a longitudinal axis of the piezoelectric element 16c. The oscillator 12 has two nodes on the central axis of the oscillatory element 14 and located inwardly from opposite ends of the oscillatory element 14 by a distance of 0.224×L. L is the length of the oscillatory element 14.

Two supporting members 18 and 20 are fixed to the oscillatory element 14 at a location adjacent to the two nodes of the oscillator 12, respectively. The two supporting members 18 and 20 include annular coils 18a and 20a, respectively. The annular coils 18a and 20a are made of metal, for example, and each have one turn. The oscillatory element 14 is disposed within the supporting members 18 and 20 and fixed to a predetermined location of the annular coils 18a and 20a.

The center of each of the two supporting members 18 and 20 is welded, glued or otherwise secured to one ridge of the oscillatory element 14 between two sides where the piezoelectric elements 16a and 16b are formed. The two supporting members 18 and 20 are located inwardly from the opposite ends of the oscillatory element 14 by a distance of 0.224×L. The supporting members 18 and 20 have respective fixed points 18c and 20c (fixed portions of the oscillatory element 14) fixed to the predetermined location of the oscillatory element 14 along the ridge.

The inner periphery of each of the annular coils 18a and 20a serves as a protection stopper to limit lateral displacement of the oscillator 12.

Opposite ends of the two supporting members 18 and 20 are fixed to a base plate 22. The base plate 22 is made, for example, of ceramic or other insulating materials. The base plate 22 is adhesively attached to a workpiece plate or support table (not shown) which is made of metal or ceramic. A foamed sheet or damper (not shown) is disposed between the base plate 22 and the support table and is made of silicon rubber or silicon resin.

Figure 2A:
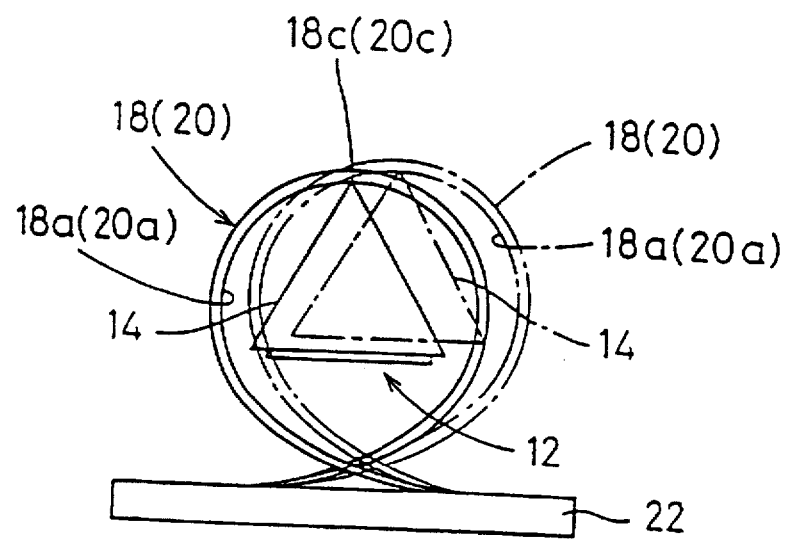
FIG. 2(A) is a front view of the oscillator gyroscope showing the manner in which an oscillatory element and supporting members are moved when shock or similar loads are imposed on an oscillator.
Figure 2B:
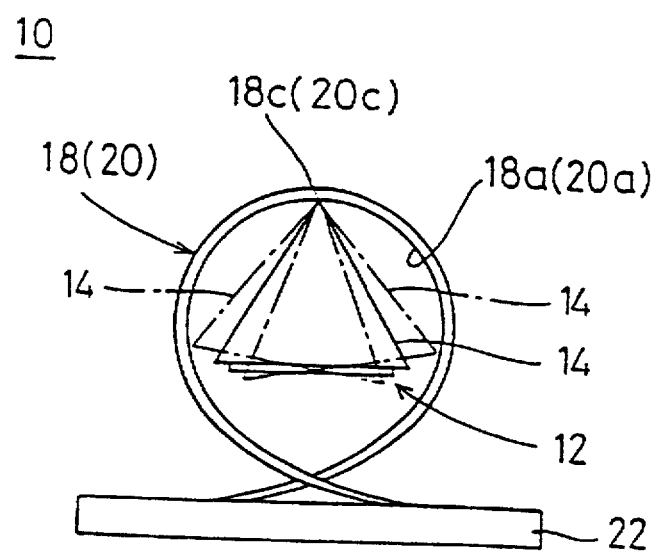
FIG. 2(B) is a front view of the oscillator gyroscope showing the manner in which the oscillatory element and the supporting members are moved when undue shock loads are imposed on the oscillator.

With the oscillator gyroscope of this embodiment, the supporting members 18 and 20 are in the form of coils, and the oscillator is disposed within the annular coils 18a and 20a. When external shock loads are exerted on the oscillator, undue displacement of the oscillator is limited within the annular coils 18a and 20a. Thus, the oscillator is free from undue rotation upon application of external shock loads. Specifically, displacement of the oscillator 12 due to a change in the shape of the annular coils 18a and 20a counteracts distortion of the oscillator 12 per se. This limits rotation of the oscillator 12 as shown in FIG. 2(A). When undue shock loads are imposed, the inner peripheries of the annular coils 18a and 20a serve as protection stoppers to limit undue rotation of the oscillator 12 as shown in FIG. 2(B).

Figure 5:
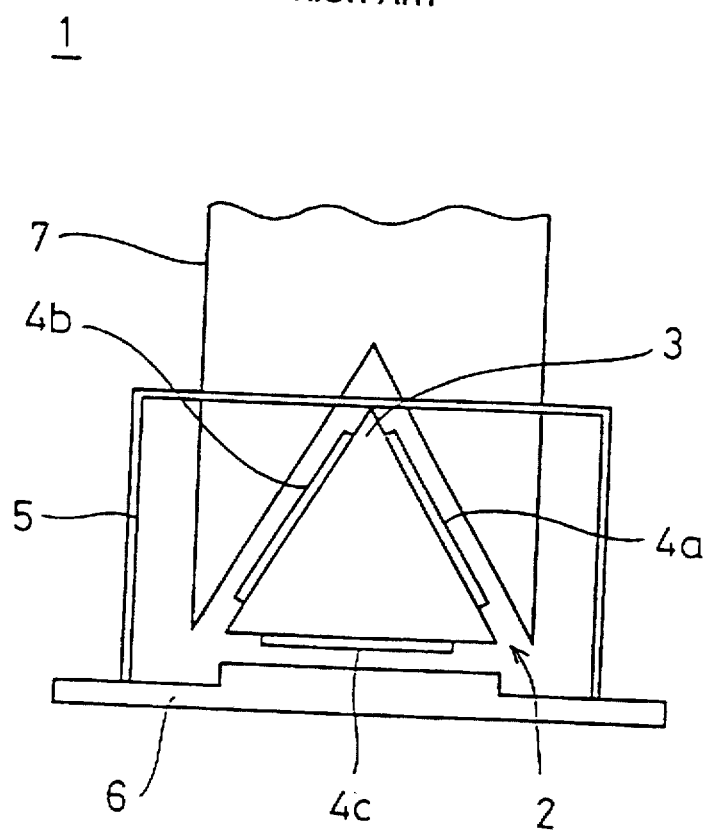
FIG. 5 is a front view of an oscillator gyroscope also known in the art.

Also, the oscillator gyroscope of this embodiment eliminates the need for a protection stopper for limiting displacement of the oscillator as in the prior art gyroscope shown in FIG. 5. Thus, the gyroscope of this embodiment is not only simpler and smaller, but also more economical to manufacture than the prior art gyroscope. Also, the supporting members 18 and 20 are coiled rather than C-shaped or trapezoidal. This permits a further reduction in the production cost of the oscillator gyroscope.

The thinner the material of the supporting members, the less the mechanical strength of the supporting members. On the other hand, the thicker the material of the supporting members, the less the stability of the supporting members. This is because vibration of the supporting members tends to be transmitted to other members, or the supporting members are subjected to external vibrations. A conventional supporting member is typically made of an elastic material which has a relatively high strength and is suitable for soldering. The oscillator gyroscope of the present invention eliminates the use of such a special material and is thus more economical to manufacture.

In other words, the present invention provides a structure for supporting an oscillator which better resists shock loads, is compact, and is inexpensive to manufacture. An oscillator gyroscope to which the present invention is applied is capable of accurately detecting angular velocity regardless of shocks.

Figure 6A:
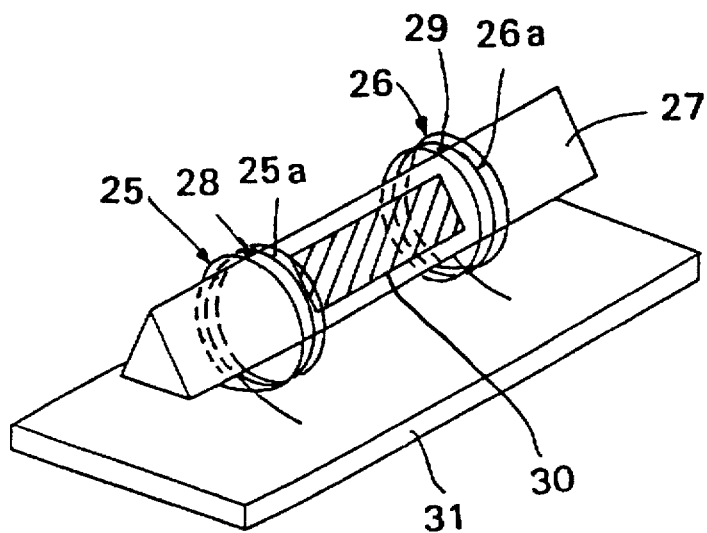
FIG. 6(A) is a perspective view of an oscillator gyroscope according to another embodiment of the invention employing an annular coil having a plurality of turns as a supporting member.
Figure 6B:
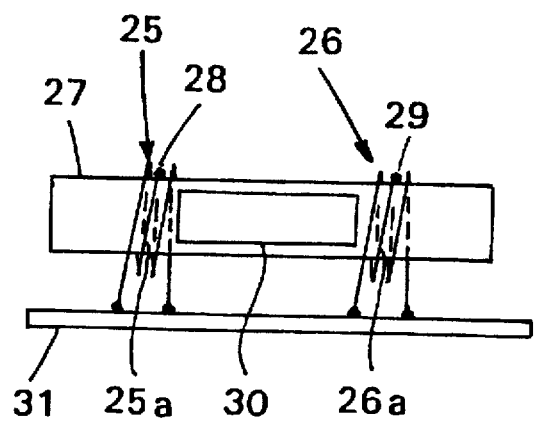
FIG. 6(B) is a side view of the oscillator gyroscope shown in FIG. 6(A)
Figure 6C:
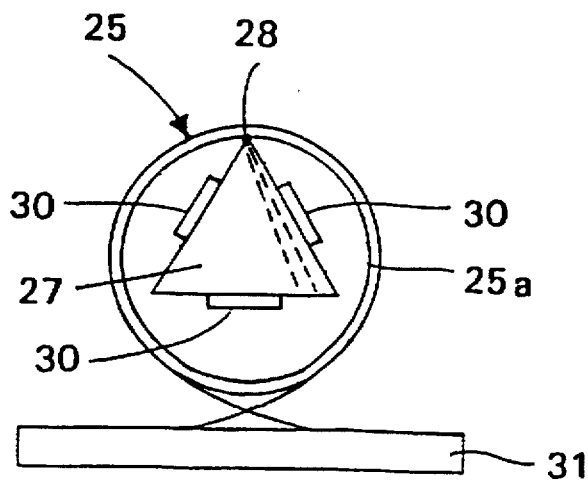
FIG. 6(C) is a front view of the oscillator gyroscope shown in FIG. 6(A).

In the foregoing embodiment, the supporting member is in the form of an annular coil with one turn. Alternatively, as shown in FIGS. 6(A), 6(B) and 6(C), annular coils 25 and 26 having a plurality of turns, such as three in the embodiment of FIGS. 6(A)–6(C), may be employed. In such a case, the oscillatory element 27 is fixed by, for example, welding to points 28 and 29 on respective ones of the plurality of turns of the annular coils 25 and 26, e.g., the middle turns 25(a) and 26(a). As in the previous embodiment, the oscillatory element 27 includes piezoelectric elements 30 and a base plate 3. As should be appreciated, although the oscillatory element 27 in this embodiment is shown as only being welded to the middle turn of each annular coil, it could advantageously be welded to all of the turns.

In the foregoing embodiments, the oscillatory elements 14 and 27 are in the form of a triangular prism. Alternatively, the oscillatory elements 14 and 27 may be in the form of a quadratic or other polygonal prism or even a cylinder.

In the foregoing embodiments, the oscillator includes three piezoelectric elements. Alternatively, the oscillator may include a larger or lesser number of piezoelectric elements as the case may be.

The present invention has been described with respect to its preferred embodiments. It will be understood, however, that various modifications and changes may be made without departing from the spirit and scope of the invention as defined by the appended claims.

What is claimed is:

1. A structure for supporting an oscillator, comprising:

an oscillator including an oscillatory element, said oscillatory element being columnar and having nodes; and supporting members fixed to said oscillatory element at a location adjacent to said nodes, said supporting members including annular coils within which said oscillator is secured to said coils at respective single points such that other points of said oscillator are spaced from said coils.

2. The structure of claim 1, wherein said annular coils each have one turn.

3. The structure of claim 1, wherein said annular coils each have a plurality of turns.

4. The structure of claim 3, wherein said oscillator is secured to one of said plurality of turns of said coils.

5. A structure for supporting an oscillator, comprising:

an oscillator including an oscillatory element, said oscillatory element being a triangular prism defined by three faces and a longitudinal ridge and having nodes; and supporting members fixed to said oscillatory element at a location adjacent to said nodes, said supporting members including annular coils within which said oscillator is secured to said coils at respective single points such that other points of said oscillator are spaced from said coils.

6. The structure of claim 5, wherein said annular coils each have one turn.

7. The structure of claim 5, wherein the nodes are located on said ridge.

8. The structure of claim 7, wherein there are two nodes respectively located inwardly of opposite ends of the oscillatory element by a distance 0.224L, where L is the length of the oscillatory element.

9. The structure of claim 8, wherein at least one piezoelectric element is disposed on each face of the oscillatory element.

10. The structure of claim 5, wherein said annular coils each have a plurality of turns.

11. The structure of claim 10, wherein said oscillator is secured to one of said plurality of turns of said coils.

* * * * *